(12) United States Patent
Wang (10) Patent No.: US 6,397,888 B1
(45) Date of Patent: Jun. 4, 2002

(54) WATER FLOW TIMER

(76) Inventor: Hsin-Fa Wang, No. 68 Mou Tan Lane Shao An Li, Lu Kang Town, Chang Hua Hsien (TW)

(*) Notice: Subject to any disclaimer, the term of this patent is extended or adjusted under 35 U.S.C. 154(b) by 0 days.

(21) Appl. No.: 09/973,165

(22) Filed: Oct. 9, 2001

(51) Int. Cl.$^7$ ................................................. E03B 7/07
(52) U.S. Cl. ................................. 137/624.12; 137/883
(58) Field of Search .......................... 137/624.12, 883, 137/624.11; 239/70

(56) References Cited

U.S. PATENT DOCUMENTS

| | | | | |
|---|---|---|---|---|
| 4,351,360 A | * | 9/1982 | Smyth .................... | 137/624.12 |
| 5,082,022 A | * | 1/1992 | Boundy ................. | 137/624.12 |
| 5,971,011 A | * | 10/1999 | Price ................. | 137/624.12 X |
| 6,047,729 A | * | 4/2000 | Hollister et al. ........ | 137/883 X |
| 6,337,635 B1 | * | 2/2002 | Ericksen et al. .... | 137/624.12 X |

* cited by examiner

*Primary Examiner*—Kevin Lee
(74) *Attorney, Agent, or Firm*—Harrison & Egbert (57) ABSTRACT

A water flow timer includes a housing, a battery set, a plurality of drive motors, a transmission gear set, an electronic controller, a time adjustment switch, and a manual control switch. The housing is provided therein with a manual water outlet which is in turn provided with a control valve controlled by the manual control switch. The housing is provided therein with one or more automatic water outlets which are controlled by the time adjustment switch in conjunction with the electronic controller, the drive motors, and the transmission gear set.

3 Claims, 10 Drawing Sheets

WATER FLOW TIMER

BACKGROUND OF THE INVENTION

1. Field of the Invention

The present invention relates generally to an irrigation implement, and more particularly to a water flow timer.

2. Description of Related Art

Figure 1:
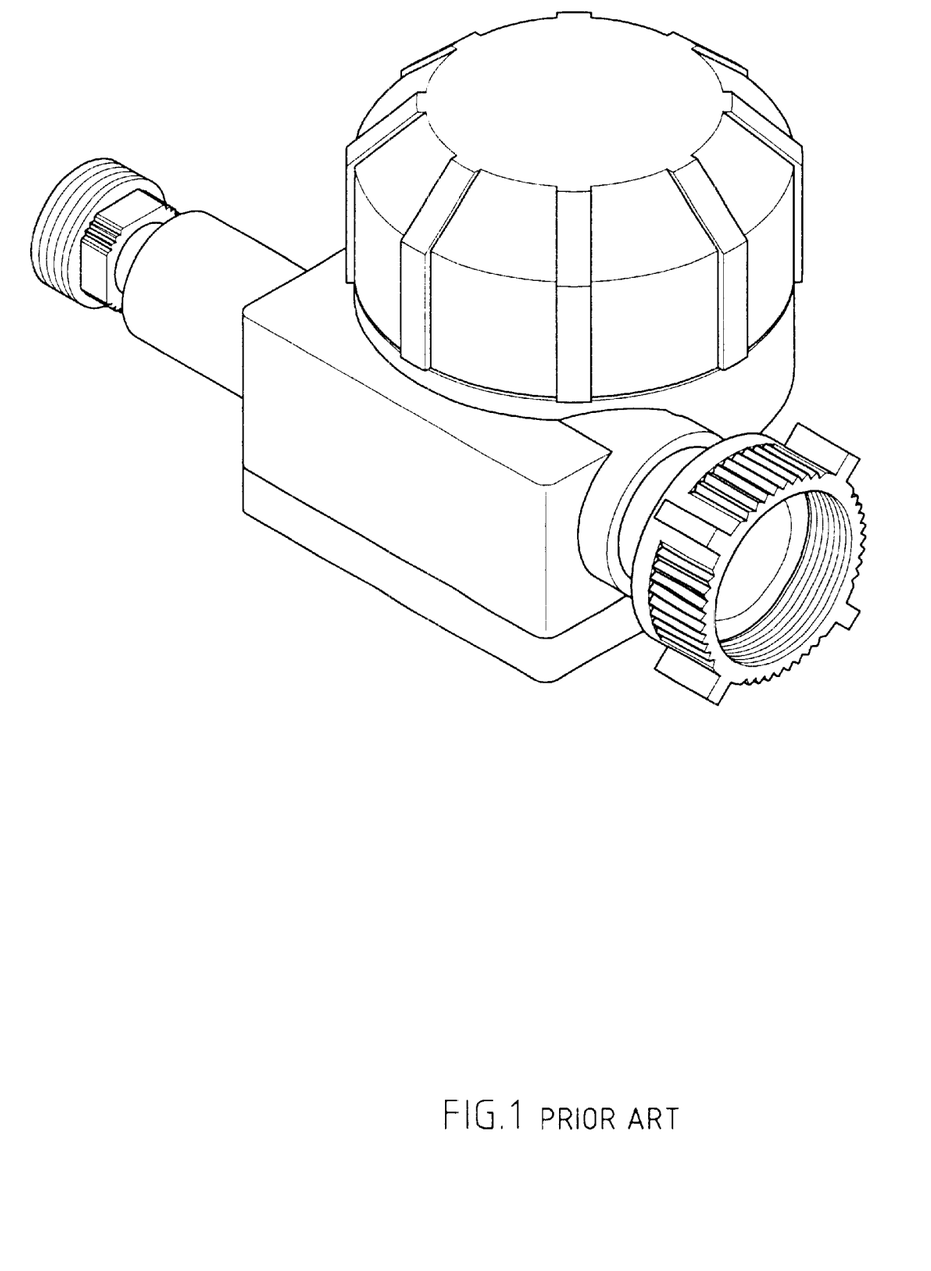
FIG. 1 shows a perspective view of a water flow timer of the prior art.
Figure 2:
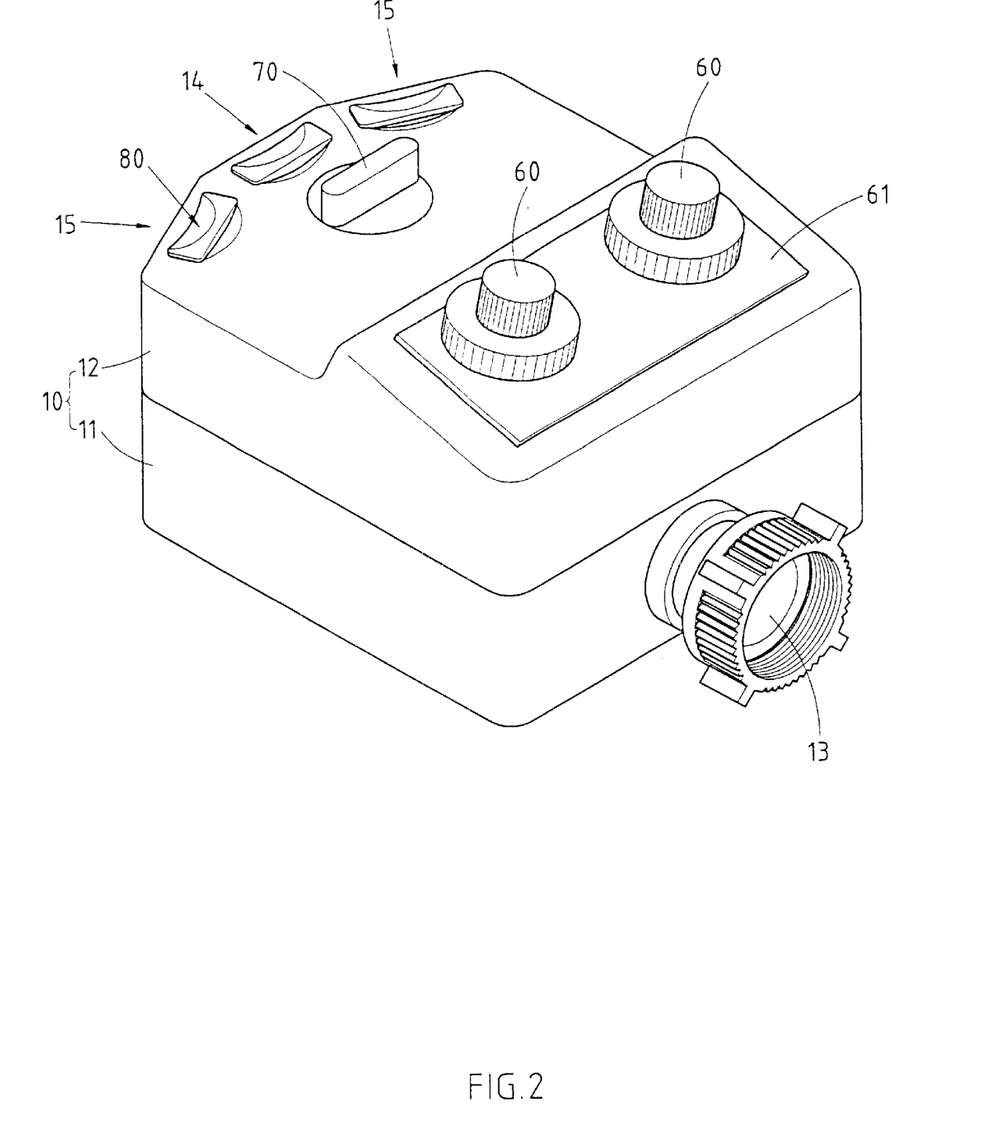
FIG. 2 shows a perspective view of the preferred embodiment of the present invention.
Figure 3:
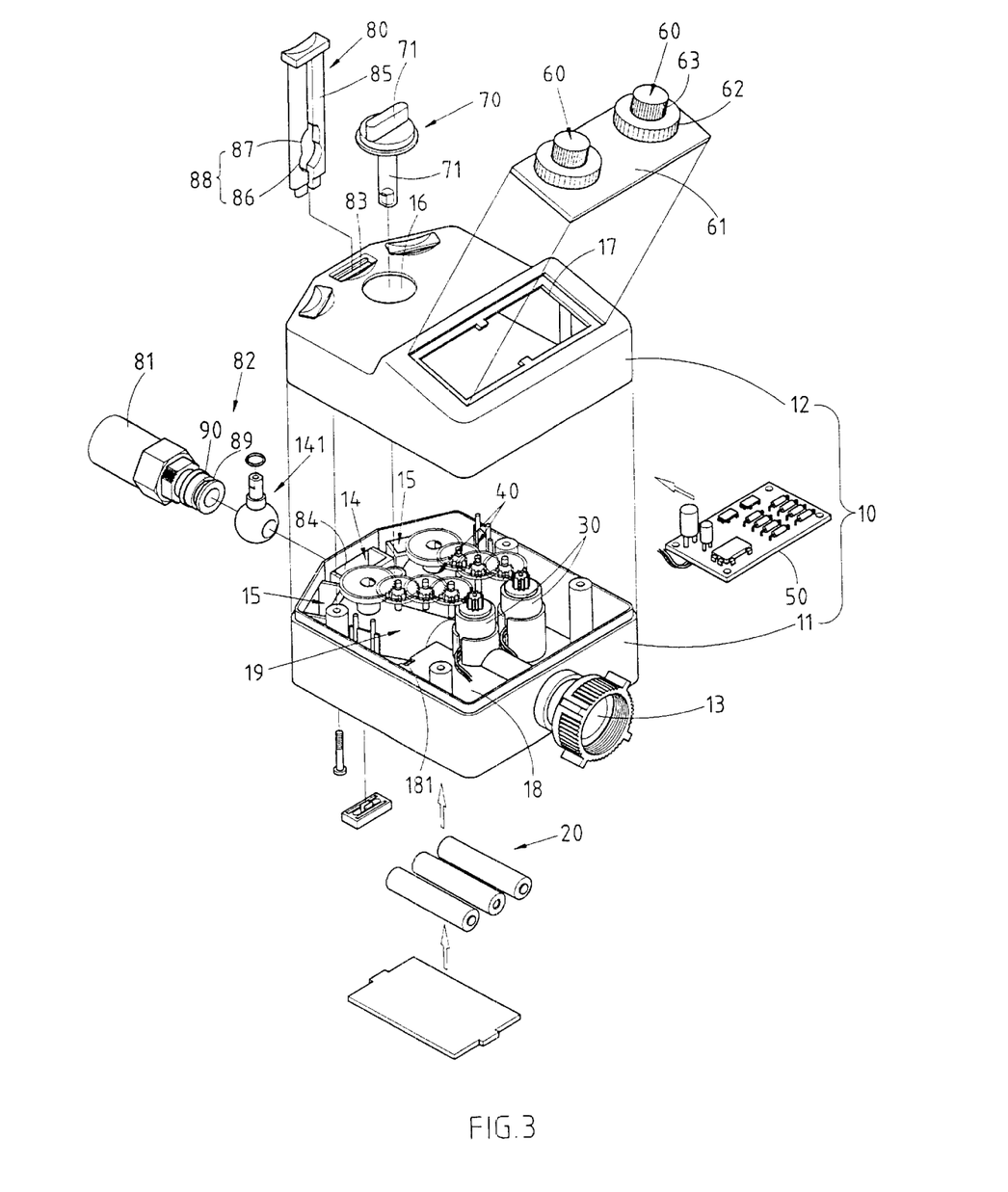
FIG. 3 shows an exploded view of the preferred embodiment of the present invention.

As shown in FIG. 1, the conventional water flow timer comprises a housing in which a delay gear member or electronic circuit device is mounted. In other words, the conventional water flow timer is operated mechanically or electronically. As a result, the conventional water flow timer is adapted to only one specific timing mode. The efficiency of an agricultural irrigation system can be enhanced by the use of a mechanical timing mode along with an electronic timing mode, thereby calling for the purchase of additional water flow timers. In addition, when the conventional water flow timer is mechanically or electronically out of order, it cannot be operated manually.

BRIEF SUMMARY OF THE INVENTION

The primary objective of the present invention is to provide a water flow timer which can be operated automatically or manually.

The water flow timer of the present invention comprises a housing, a battery set, a plurality of drive motors, a transmission gear set, an electronic controller, a time adjustment switch, and a manual control switch. The housing is provided with a water inlet, an automatic water outlet, and a manual water outlet. The automatic water outlet is electronically controlled, whereas the manual water outlet is manually controlled.

The features, functions and advantages of the present invention will be more readily understood upon a thoughtful deliberation of the following detailed description of a preferred embodiment of the present invention with reference to the accompanying drawings.

DETAILED DESCRIPTION OF THE INVENTION

As shown in FIGS. 2–6, a water flow timer embodied in the present invention comprises a housing 10, a battery set 20, a plurality of drive motors 30, a transmission gear set 40, an electronic controller 50, a time adjustment switch 60, and a manual control switch 70.

The housing 10 is formed of a lower body 11 and an upper body 12. The lower body 11 is provided with a water inlet 13, a manually-controlled water outlet 14, and an automatically-controlled water outlet 15. The manually-controlled water outlet 14 is provided therein with a control valve 141, whereas the automatically-controlled water outlet 15 is provided therein with a control valve 151. The upper body 12 is provided with a first assembly hole 16 and a second assembly hole 17. The first assembly hole 16 is corresponding in location to the control valve 141 of the manually-controlled water outlet 14. The lower body 11 is provided in the interior with a battery slot 18 and a receiving space 19.

The battery set 20 is disposed in the battery slot 18 which is provided with a through hole 181 via which the wire of the battery set 20 is disposed in the receiving space 19 of the lower body 11.

The drive motors 30 are mounted in the receiving space 19 and are connected with the battery set 20.

The transmission gear set 40 is mounted between the drive motors 30 and the automatic water outlet 15 for actuating the control valve 151 of the automatic water outlet 15.

The electronic controller 50 is disposed in the receiving space 19 for controlling the operation of the drive motors 30.

The time adjustment switch 60 has a base plate 61, which is mounted in the second assembly hole 17 of the upper body 12 such that the time adjustment switch 60 is connected to the electronic controller 50. The action time of the drive motors 30 is determined by the time adjustment switch 60 in conjunction with the electronic controller 50. In the event that the lower body 11 is provided with a plurality of automatic water outlets 15, the time adjustment switch 60 is equal in number to the automatic water outlets 15.

The manual control switch 70 is mounted in the first assembly hole 16 of the upper body 12 of the housing 10 and is provided with a connection portion 71, which is connected to the control valve 141 of the manual water outlet 14.

The water outlets 14 and 15 are provided with a fast disconnection structure comprising a disconnection device 80, a pipe 81, an upper guide slot 83 of the upper body 12, and a lower guide slot 84 of the lower body 11. The disconnection device 80 comprises a locating plate 85 which is provided with a through hole 88 having a large diametrical portion 86 and a small diametrical portion 87. The large diametrical portion 86 and the small diametrical portion 87 are coaxial with the water outlets 14 and 15. The pipe 81 is provided with a joint 82 which is provided with a large diametrical head 89 corresponding to the large diametrical portion 86 of the locating plate 85, and a small diametrical groove 90 corresponding to the small diametrical portion 87 of the locating plate 85. When the locating plate 85 is slid upward in the guide slots 83 and 84, the large diametrical portion 86 of the through hole 88 of the locating plate 85 catches the joint 82 of the pipe 81. The locating plate 85 is slid downward in the guide slots 83 and 84 such that the small diametrical portion 87 of the through hole 88 of the locating plate 85 is retained in the groove 90 of the joint 82.

Figure 4:
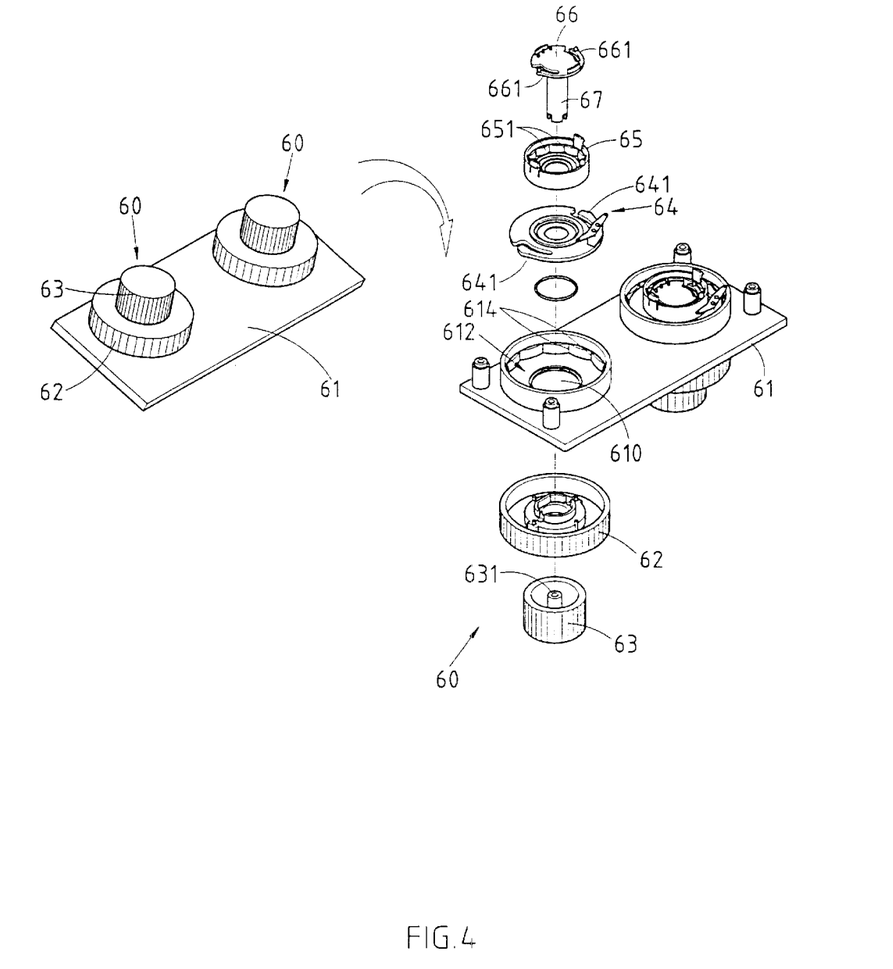
FIG. 4 shows an exploded view of the time adjustment switch of the preferred embodiment of the present invention.
Figure 9:
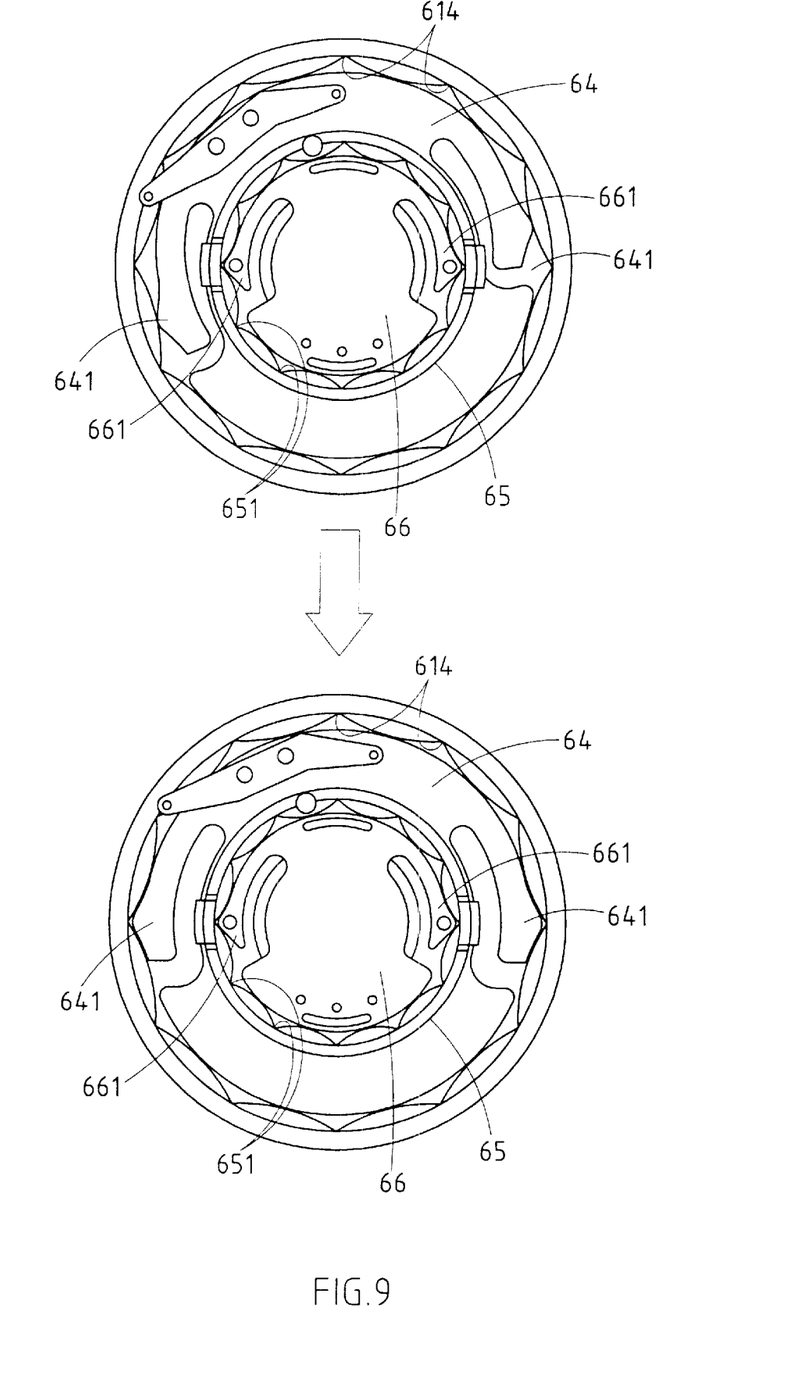
FIG. 9 shows a schematic view of the locating plane of the hour adjusting button of the preferred embodiment of the present invention in action.
Figure 10:
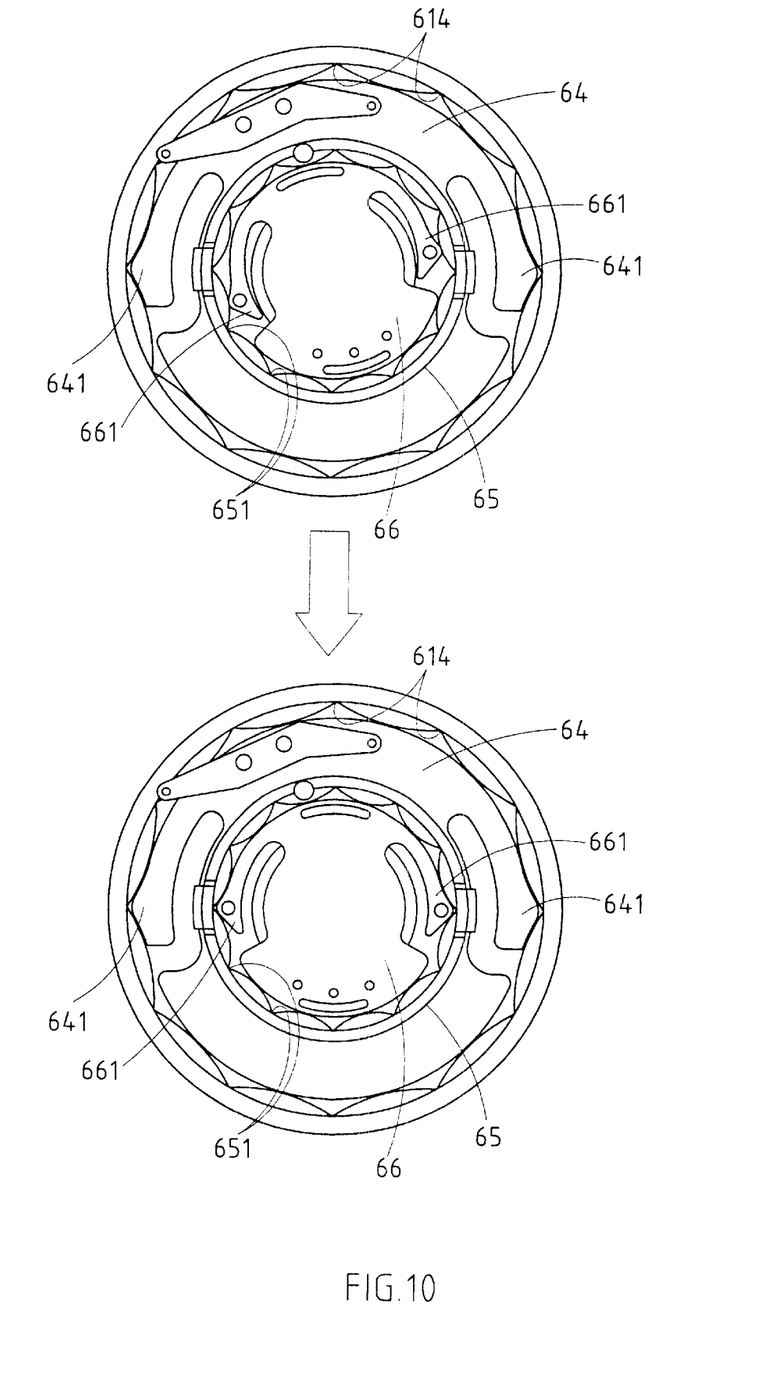
FIG. 10 shows a schematic view of the locating plane of the minute adjusting button of the preferred embodiment of the present invention in action.

As shown in FIGS. 4, 9, and 10, the time adjustment switch 60 comprises an hour-adjusting button 62 and a minute-adjusting button 63. The button 62 is provided with a slot 621, whereas the button 63 is provided with a pillar 631. A base plate 61 of the switch 60 is provided with an assembly hole 610 which is provided in the underside with a receiving slot 612. An inner seat body 65 with a first locating plate 64 is received in the receiving slot 612. An assembly rod 67 with a second locating plate 66 is put through the inner seat body 65. The first locating plate 64 and the hour-adjusting button 62 is fastened with the pillar 631. The first locating plate 64 is provided with two elastic retaining claws 641, whereas the second locating plate 66 is provided with two elastic retaining claws 661. The receiving slot 612 is provided in the inner wall with a plurality of retaining edges 614 engageable with the claws 641 of the first locating plate 64. The inner seat body 65 is provided with a plurality of retaining edges 651 engageable with the claws 661 of the second locating plate 66.

Figure 5:
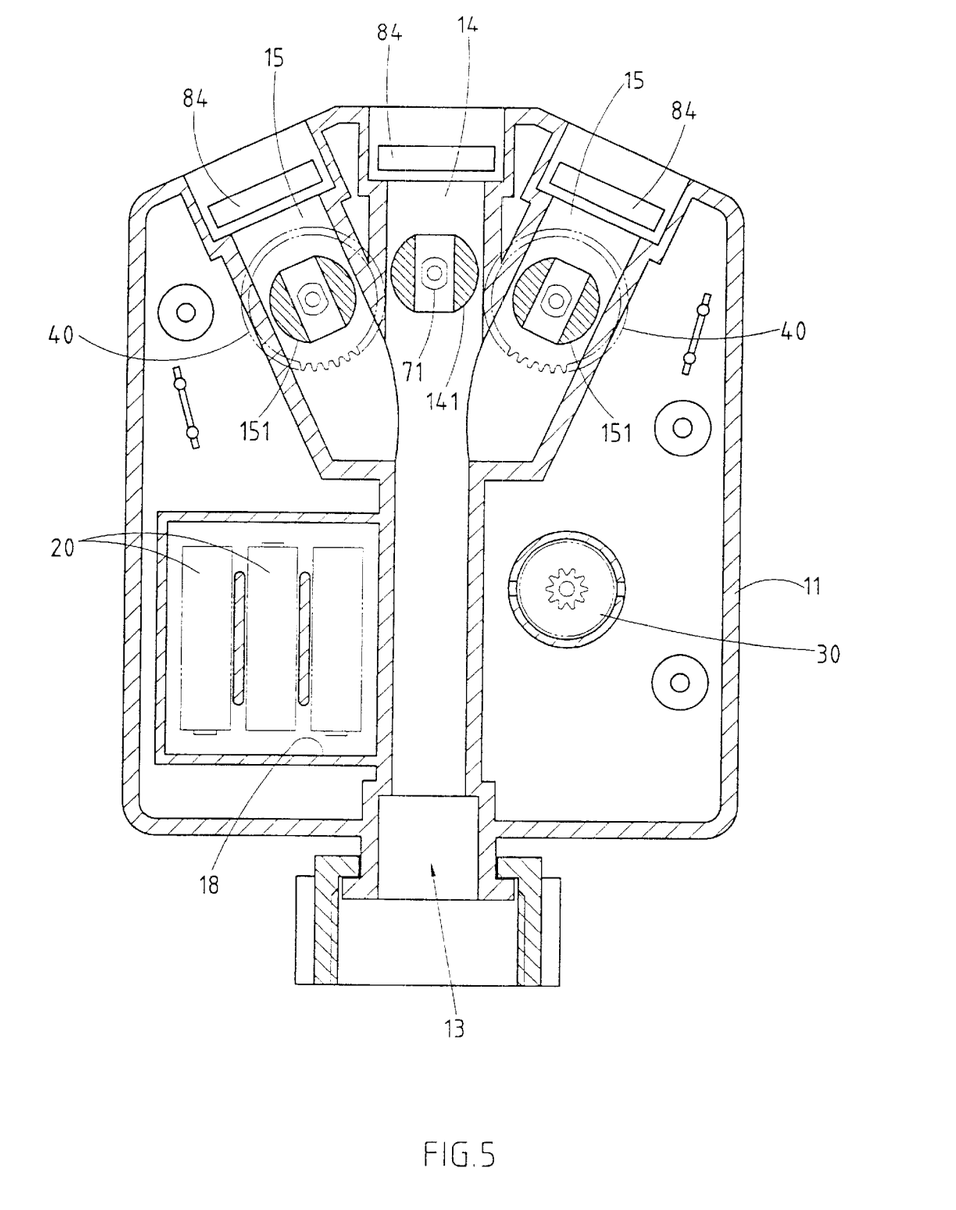
FIG. 5 shows a sectional view of the preferred embodiment of the present invention.
Figure 6:
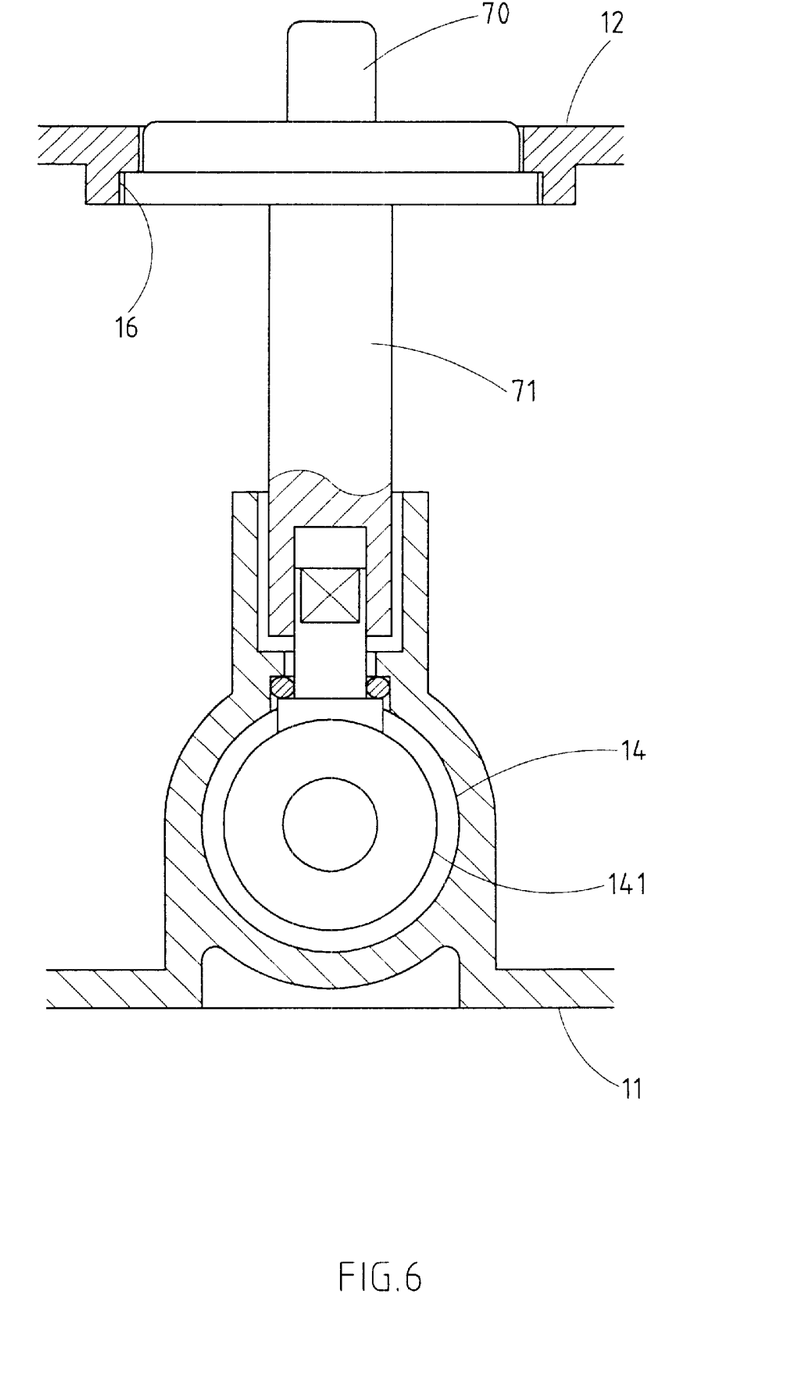
FIG. 6 shows a partial sectional view of the preferred embodiment of the present invention.
Figure 7:
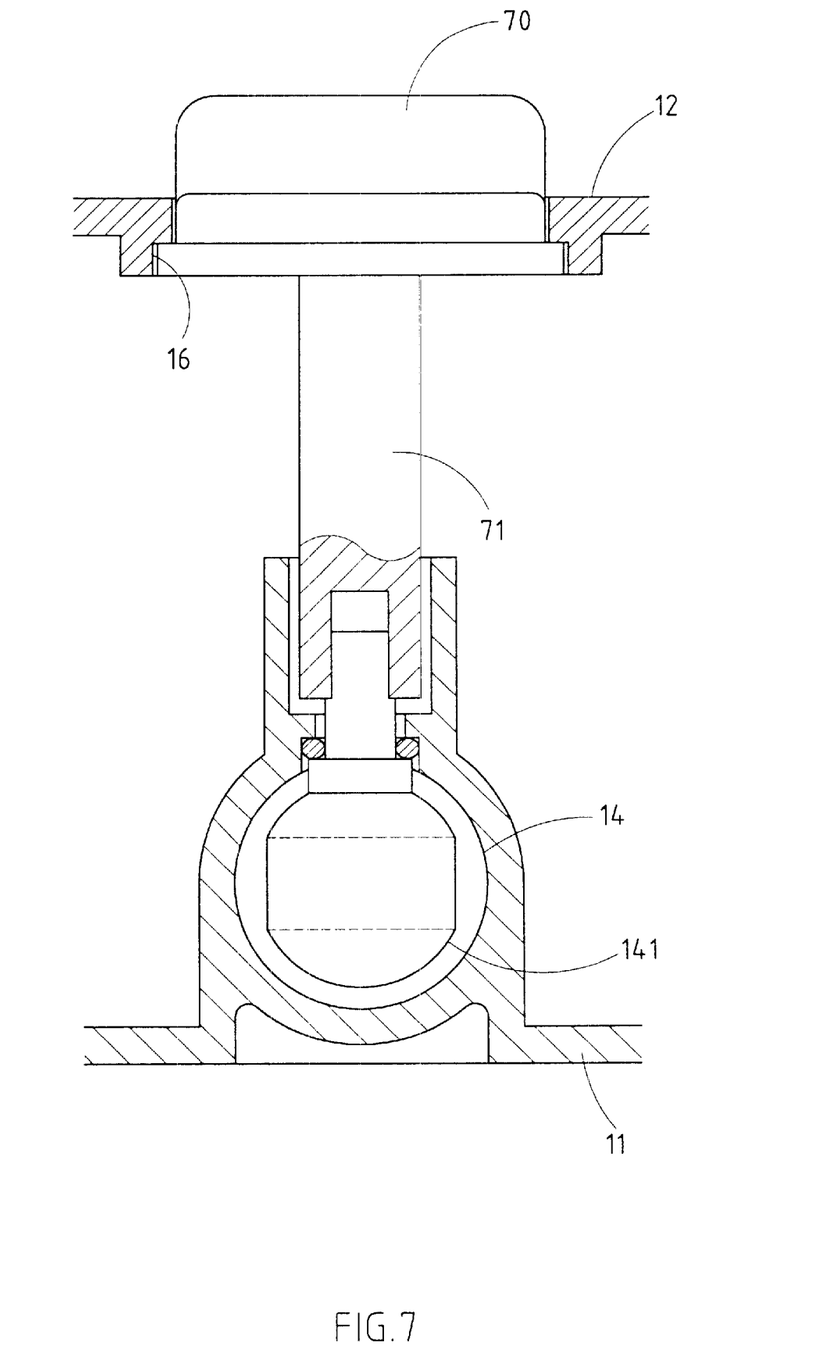
FIG. 7 shows a sectional schematic view of the preferred embodiment of the present invention in action.
Figure 8:
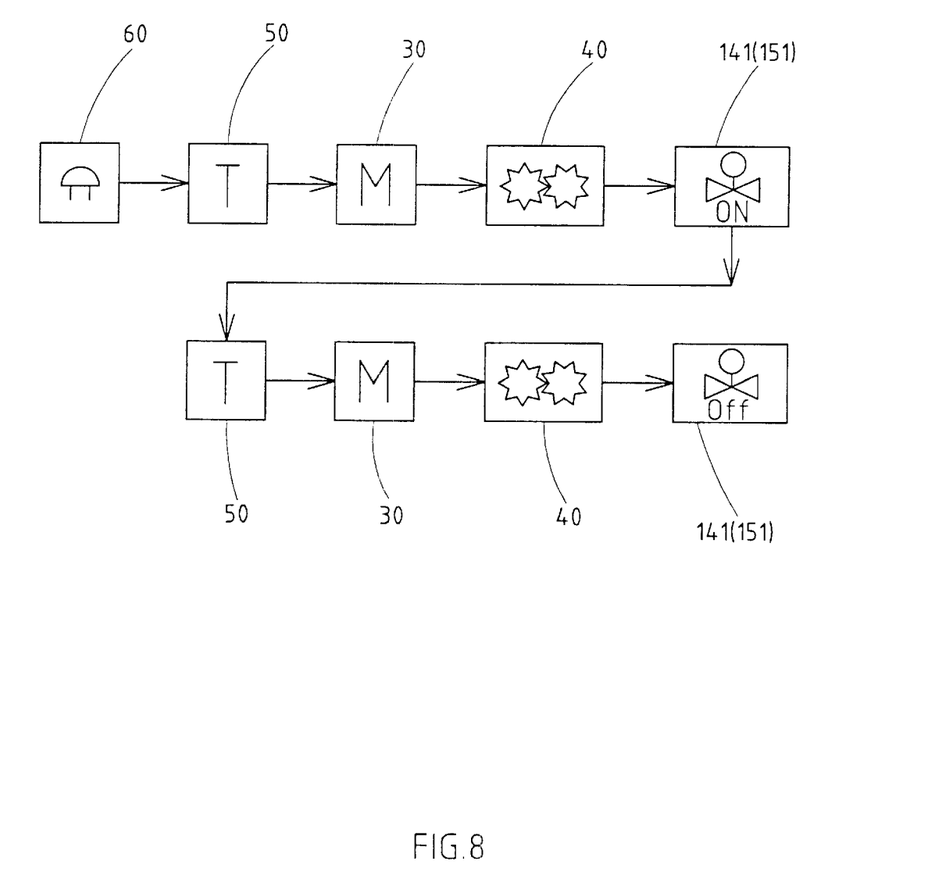
FIG. 8 shows a block diagram of the action of the time adjustment switch of the preferred embodiment of the present invention.

The control valve 141 of the manual water outlet 14 is directly controlled by the manually-controlled switch 70, as illustrated in FIGS. 5 and 6. The control valves 151 are controlled by the time adjustment switch 60 in conjunction with the electronic controller 50, the drive motors 30, and the transmission gear seat 40.

The embodiment of the present invention described above is to be regarded in all respects as being merely illustrative and nonrestrictive. Accordingly, the present invention may be embodied in other specific forms without deviating from the spirit thereof. The present invention is therefore to be limited only by the scope of the following claims.

I claim:

1. A water flow timer comprising:
    a housing having a lower body and an upper body, said lower body having a water inlet and a manual water outlet and at least one automatic water outlet, said manual water outlet having a control valve cooperative therewith, the automatic water outlet having a control valve cooperative therewith, said upper body having a first assembly hole corresponding in location to said control valve of said manual water outlet, said upper body having a second assembly hole formed therein, said lower body having a battery slot formed in an interior thereof, said lower body having a receiving space formed therein;
    a battery set disposed in said battery slot, said battery slot having a through hole, said battery set having a wire extending through said through hole, said wire being received in said receiving space of said lower body;
    a plurality of drive motors mounted in said receiving space of said lower body of said housing, said plurality of drive motors connected by said wire to said battery set;
    a transmission gear means mounted between said plurality of driving motors and the automatic water outlet, said transmission gear means for actuating the control valve of the automatic water outlet;
    an electronic controller means disposed in said receiving space of said lower body, said electronic controller means for controlling said plurality of drive motors;
    a time adjustment switch having a base plate, said base plate mounted in said second assembly hole of said upper body of said housing, said time adjustment switch connected to said electronic controller means; and
    a manual control switch mounted in said first assembly hole of said upper body of said housing, said manual control switch having a connection portion connected to said control valve of said manual water outlet.

2. The water flow timer of claim 1, said manual water outlet and the automatic water outlet having a fast disconnection structure, said fast disconnection structure comprising:
    a disconnection device comprising a locating plate having a through hole, said through hole having a large diametrical portion and a small diametrical portion, said large diametrical portion and said small diametrical portion being coaxial with said manual water outlet and the automatic water outlet;
    a pipe having a joint with a large diametrical head corresponding to said large diametrical portion of said locating plate, said joint having a small diametrical groove corresponding to said small diametrical portion of said locating plate;
    an upper guide slot formed in said upper body of said housing; and
    a lower guide slot formed in said lower body of said housing, said locating plate being slidable upwardly in said upper and lower guide slots such that said large diametrical portion of said through hole of said locating plate catches said joint of said pipe, said locating plate being slidable downwardly in said upper and lower guide slots such that said small diametrical portion of said through hole of said locating plate is retained in said groove of said joint of said pipe.

3. The water flow timer of claim 1, said time adjustment switch comprising:
    an hour-adjusting button having a slot;
    a minute-adjusting button having a pillar, said base plate having an assembly hole with a receiving slot in an underside thereof;
    an inner seat body having a first locating plate received in said receiving slot; and
    an assembly rod having a second locating plate extending through said inner seat body, said first locating plate and said hour-adjusting button being fastened to said pillar of said minute-adjusting button, said first locating plate having two elastic claws, said second locating plate having an inner wall with a plurality of retaining edges engageable with said elastic claws of said first locating plate, said inner seat body having a plurality of retaining edges engageable with said elastic claws of said second locating plate.

* * * * *